United States Patent [19]

Cassidy et al.

[11] 4,260,491

[45] Apr. 7, 1981

[54] CHROME REMOVAL WASTE TREATMENT PROCESS

[75] Inventors: John D. Cassidy, Ambler; Lester Steinbrecher, Southampton, both of Pa.

[73] Assignee: Amchem Products, Inc., Ambler, Pa.

[21] Appl. No.: 960,945

[22] Filed: Nov. 15, 1978

[51] Int. Cl.$^3$ .............................................. C02F 1/70
[52] U.S. Cl. ................................... 210/720; 210/913; 210/724
[58] Field of Search ............. 210/DIG. 30, 50, 51–54

[56] References Cited

U.S. PATENT DOCUMENTS

| | | | |
|---|---|---|---|
| 3,575,853 | 4/1971 | Gaughan et al. | 210/DIG. 30 |
| 3,956,121 | 5/1976 | Haschke et al. | 210/DIG. 30 |
| 4,005,009 | 1/1977 | Kinoshita et al. | 210/DIG. 30 |

FOREIGN PATENT DOCUMENTS 46-16389  5/1971  Japan .
47-17697  9/1972  Japan .

OTHER PUBLICATIONS

Hoover et al., "Disposal of Waste Liquors from Chromium Plating," *Ind. and Eng. Chem.*, vol. 33, No. 1, Jan. 1941, pp. 131–134.

*Primary Examiner*—Thomas G. Wyse
*Attorney, Agent, or Firm*—Alexis Barron

[57] ABSTRACT

A process is disclosed for the removal of chrome from waste water containing chrome in addition to at least one chelating agent for trivalent chromium. The chrome-containing waste water is treated at low pH with both a reducing agent suitable for converting hexavalent chrome to trivalent chrome and with a ferric or aluminum sulfate or chloride salt. Following the reduction step, the pH of the now acidic solution is raised, using an inorganic base, to a pH sufficient to cause the formation of chromic hydroxide. The process of this invention is particularly suitable where rapid sedimentation processes, such as are achievable by the use of the lamella separator, are contemplated.

18 Claims, No Drawings

CHROME REMOVAL WASTE TREATMENT PROCESS

FIELD OF THE INVENTION

This invention pertains to liquid purification processes for chrome-containing waste water and is more particularly directed to such processes where purification involves solids precipitation, sedimentation and separation from waste water containing both chrome and at least one chelating agent for trivalent chromium.

BACKGROUND AND DESCRIPTION OF THE PRIOR ART

Chromates, including sodium chromate or chromic acid, as well as many other compositions containing the chromium moiety are often referred to generically as "chrome". Chrome-containing compositions enjoy widespread industrial usage but their residues are objectionable from an environmental standpoint to the extent that they form a constituent of the waste water effluent. The use of chrome, especially as chromates, is, however, essential in many industrial operations. For example, their use is very important as an after-rinse for metals which have been subjected to a so-called "conversion coating" for the purpose of enhancing the metal's corrosion resistance and paint bonding characteristics. Examples of conversion coating processes may be found in U.S. Pat. Nos. 2,819,193, 2,928,762 and 2,936,254. An example of a chrome after-rinse process suitable for use in conjunction with a conversion coating process may be found in U.S. Pat. No. 3,863,877. Spent chrome rinse baths and wash water rinse solutions contain small (usually less than 100 ppm) amounts of the chromate $CrO_4^{--}$ or dichromate $Cr_2O_7^{--}$ ions. Chrome as part of these ions appears with a valence of +6, in which condition it is both toxic and soluble. To remove the chrome, which in the +6 valance state is known as chromyl, it is necessary to reduce the valence state to +3, referred to as chromic. In the lower valence state chromic hydroxide, $Cr(OH)_3$, may then be precipitated. The reduction of the chrome ion from +6 to +3 may be accomplished satisfactorily at a low pH of below about 5.0. The reducing agents for this purpose are well known and include metallic iron, ferrous sulfate, sulfur dioxide and the potassium or sodium sulfites, bisulfites or metabisulfites. Following reduction of the chrome ion to its +3 valent state, caustic soda or lime has been disclosed as suitable to precipitate chromic hydroxide.

The removal of chrome from chrome-containing waste water by precipitation of chromic hydroxide is known in the art. By way of illustration, copending U.S. application Ser. No. 917,506 discloses a process for the purification of chrome-containing waste water by treating the waste water with both a reducing agent suitable for converting hexavalent chrome to trivalent chrome and a magnesium, calcium, ferric or aluminum sulfate or chloride salt. Following the reduction step, the pH of the now acidic solution is raised with caustic to cause the formation of a chromic hydroxide precipitate. As a further example, Japanese Pat. No. 47-17697, issued Sept. 9, 1972, discloses precipitating chromic hydroxide from waste water by the process of (a) reducing hexavalent chromium in the waste water to trivalent chromium at a pH of about 2 using a reducing agent; (b) neutralizing with alkali at a pH of at least 8; and (c) adding magnesium ions (either prior to or after the reduction and neutralization steps) to precipitate the chromic hydroxide. As another example, Japanese Pat. No. 71-16389, published May 6, 1971, discloses a process for treating chromium containing waste water comprising reducing hexavalent chromium to trivalent chromium and adding to the resulting solution of reduced chromium a mixture of aluminum sulfate and sodium hydroxide or calcium hydroxide in order to effect precipitation of chromic hydroxide.

Special problems are associated with chrome-containing waste water solutions which also contain a chelating agent for trivalent chromium such as, for example, ethylenediaminetetraacetic acid. Once the hexavalent chromium is neutralized to trivalent chromium, the chelating agent will tend to complex the trivalent chromium, thereby making removal of the chromium from solution difficult. It has now been found that ferric and aluminum (added as ferric or aluminum chloride or sulfate) are surprisingly effective in producing the precipitation of chromic hydroxide from waste water despite the presence of a chelating agent for trivalent chromium.

OBJECTS

It is an object of the present invention to provide a method for the treatment of chrome-containing waste water which also contains a chelating agent for trivalent chromium by precipitation of chromic hydroxide.

It is a further object of the present invention to provide an inexpensive method and composition for precipitating chromic hydroxide from waste water containing chrome and at least one chelating agent for trivalent chromium.

These and other objects will become apparent from a reading of the detailed specification.

SUMMARY OF THE INVENTION

This invention provides a process for the removal of chrome from waste water containing chrome and at least one chelating agent for trivalent chromium. The process comprises steps lettered (a) through (e) in sequential order:

(a) providing an aqueous medium containing chrome and at least one chelating agent for trivalent chromium, (b) adjusting the pH of said aqueous medium to below about 5 (preferably from about 2 to about 5), (c) adding to said aqueous medium, while maintaining said pH below about 5 (preferably from about 2 to about 5), and without regard to the order of addition, the following two ingredients:
  (i) a reducing agent in an amount sufficient to convert all of the chromium present in the hexavalent valence state in said chrome to the trivalent valence state and,
  (ii) one or more salts selected from the group consisting of the chloride and sulfate salts of ferric and aluminum in an amount sufficient to provide at least an amount in equivalents of the salt cation equal to 0.01 equivalents of trivalent chromium present after reduction, with the proviso that the amount in equivalents of the cation be equal to at least 0.8 times the equivalents of the chelating agent, (d) adjusting the pH of said aqueous medium to from about 7.5 to about 10.0 (preferably from about 8.2 to about 9.0) by the addition of an inorganic base to permit formation of chromic hydroxide, and (e) removing said chromic hydroxide from said solution.

Also provided is a composition suitable for precipitating chromic hydroxide from waste water containing chrome and at least one chelating agent for trivalent chromium comprising a combination of a reducing agent suitable for converting hexavalent chromium to trivalent chromium and at least one salt selected from the group consisting of chloride and sulfate salts of ferric and aluminum.

The process and composition of the invention are particularly suitable where rapid sedimentation of chrome hydroxide, such as that that is achievable using a lamella separator, is desired.

DETAILED DESCRIPTION OF THE PREFERRED EMBODIMENTS

The process of the present invention is well-suited for the treatment of waste water solutions which contain chrome and at least one chelating agent for trivalent chromium. As has been stated above, the instant process which employs ferric iron or aluminum (added as ferric or aluminum chloride or sulfate) is particularly effective in producing the precipitation of chromic hydroxide despite the presence of the chelating agent.

Chelating agents for trivalent chromium are commonly found in chrome-containing waste water solutions. The basis for the difficulty in removing chrome from solutions containing these agents is readily apparent in view of the fact that, upon reduction of hexavalent chromium to trivalent chromium as a step leading to precipitation of chromic hydroxide, the trivalent chromium will complex with the chelating agent and remain in solution. Although the theory behind the effectiveness of the ferric or aluminum chloride or sulfate of the present invention is not fully understood, the kinetic stability of aluminum and ferric iron when complexed with the chelating agent apparently facilitates precipitation of chromic hydroxide and, hence, removal of the chrome from the waste water.

The instant process is useful for treating waste water containing chrome and any chelating agent for trivalent chromium. Useful chelating agents would include, but are not limited to, organic amines and amides such as, for example, ethylenediaminetetraacetic acid (EDTA) and its sodium or potassium salts, N-2-naphthylacetamide, triethanolamine and N,N,N,N'-tetrakis (2-hydroxypropyl)ethylenediamine; salts of carboxylic acids, such as, for example, gluconates, citrates, malonates, oxalates and salicylates; and carboxylic acids, such as, for example, oxalic acid, malonic acid and 1-anthroic acid.

Other ingredients are often encountered in waste water solutions in addition to chromium and the above-mentioned chelating agents such as, for example, nitrites, phosphates and non-ionic or cationic surfactants. The process of this invention has been found to be effective in the presence of these ingredients.

The reducing agent useful in the process of the invention can be any of such agents which, as has been stated above, are well known in the art such as, for example, ferrous sulfate, sulfur dioxide, sodium sulfite, potassium sulfite, sodium metabisulfite, potassium metabisulfite, zinc hydrosulfite, sodium and potassium bisulfite, sodium hydrosulfite and potassium hydrosulfite. The reducing agent is employed in an amount sufficient to convert all of the chromium present in the hexavalent state to the trivalent state in the waste water solution being treated. The amount can be pre-calculated based upon the equivalents of hexavalent chrome present in the solution before reduction, or, in the alternative, the amount of reducing agent may be controlled during addition by redox measurements, as is well known in the art.

The salt employed in step (c) (ii) of the instant process is at least one salt selected from the group consisting of the chloride and sulfate salts of ferric and aluminum in an amount sufficient to provide at least an amount in equivalents of the salt cation equal to 0.01 equivalents of trivalent chromium present after reduction, with the proviso that the amount in equivalents of the cation be equal to at least 0.8 times the equivalents of the chelating agent. The equivalents of salt cation means total equivalents, and therefore the amount, if any, of cation already present in the waste to be treated is to be counted.

For example, assuming a total chrome present, after reduction of 100 ppm one may convert this to milli-equivalents by dividing this figure by 17.3 (the equivalent weight of a chromic ion obtained by dividing the atomic weight of 52 by the valence of 3).

$$100/17.3 = 5.78 \text{ milli-equivalents of chromic } (Cr^{+++}) \text{ present}$$

Thus, 5.78/100 milli-equivalents of salt cation must be added. In the above example, if the sole salt cation is $Fe^{+++}$, then $(0.01) \times (5.78) \times (55.8) = 3.225$ ppm of ferric ion ($Fe^{+++}$) is required provided that the above-mentioned proviso with respect to chelating agent has also been satisfied. This minimum of 3.225 ppm of ferric is a total requirement and the amount to be added may be reduced by the amounts, if any, of ferric ion in the waste water initially. Regarding the proviso that the amount in equivalents of the ferric or aluminum cation be equal to at least 0.8 times the equivalents of the chelating agent, it has been found that in the preferred embodiment of the invention, the amount of cation can range from 0.8 times the equivalents of the chelating agent to about 5 times or higher, depending upon the particular chelating agent in the waste water and the waste water system.

The results achieved using the ferric and aluminum cations of the instant invention are particularly surprising in view of the ineffectiveness of magnesium and calcium cations in achieving chromic hydroxide precipitation when used in a fashion analogous to the instant process.

Step (d) of the instant process can be carried out using any inorganic base such as, for example, sodium hydroxide, ammonium hydroxide, potassium hydroxide or calcium hydroxide. In order to facilitate precipitation of chromic hydroxide, a flocculant such as those which are widely known in the art (e.g. hydrolyzed polyacrylamide flocculant) can be used. Removal of chromic hydroxide can be effected by filtration or centrifugation, and the process of the invention has been found particularly suitable where rapid sedimentation, such as that that is achievable using a lamella separator, is desired.

Suitable process temperature can range from about 15° C. or lower to about 65° C. or higher, although room temperature is preferred. The process can be suitably conducted at atmospheric pressure unless super- or sub-atmospheric pressure is desired for some purpose.

As used herein, "wt." denotes "weight", "%" denotes "percent", "ml." denotes "milliliter" and "ppm" denotes "parts per million parts".

The following examples are illustrative of, but are not intended to limit, the present invention.

EXPERIMENTAL

The following experimental description illustrates the present invention.

EXAMPLE 1

Into a 2-liter beaker was added 1500 ml. of deionized water ("DI water"), 0.215 grams of sodium dichromate dihydrate and 0.039 grams of disodium ethylenediaminetetraacetic acid dihydrate with stirring. The resulting solution had a concentration of hexavalent chromium of 50 ppm and a concentration of ethylenediaminetetraacetate of 20 ppm. After adding 0.08 ml. of 50 wt. % NaOH and stirring for 30 minutes, a 500 ml. aliquot, having a pH of 10.4 was placed in another beaker. To the aliquot was added 0.2 ml. of an aqueous ferric sulfate solution containing 1 wt. % ferric ion so that the equivalents of ferric ion in the aliquot was equal to the equivalents of ethylenediaminetetraacetate. After stirring for 10 minutes (solution pH=9.9), 0.05 ml. of concentrated sulfuric acid was added and the solution was stirred for 5 additional minutes (solution pH=2.5). To the resulting solution 0.9 ml. of 30 wt. % aqueous sodium bisulfite was added. After stirring for 5 minutes, the solution had a pH of 2.9 and a hexavalent chromium concentration of less than 0.05 ppm. To this solution was added 0.09 ml. of 50 wt. % aqueous sodium hydroxide with stirring for 15 minutes (resulting solution pH=8.9) and then 1 ml. of 0.5 wt. % of hydrolyzed polyacrylamide flocculant was added. After settling chromic hydroxide for 30 minutes and filtration, the solution had a trivalent chromium concentration of 0.7 ppm.

EXAMPLE 2

Into a 2-liter beaker was poured 1500 ml. of DI water, 0.215 grams of sodium dichromate dihydrate and 0.039 grams of disodium ethylenediaminetetraacetic acid dihydrate with stirring. The resulting solution had a hexavalent chromium concentration of 50 ppm and an ethylenediaminetetraacetate concentration of 20 ppm. After adding 0.08 ml. of 50 wt. percent NaOH and stirring for 30 minutes, a 500 ml. aliquot having a pH of 10.4 was placed in another beaker. To the aliquot was added 0.7 ml. of a commercial aqueous aluminum sulfate solution. The aliquot had an aluminum ion concentration of 8.1 ppm which is equal to 3.5 times the equivalents of ethylenediaminetetraacetate present. After stirring for 10 minutes (solution pH=6.7), 0.04 ml. of concentrated sulfuric acid was added and the solution was stirred for an additional 10 minutes (solution pH=2.7). To the resulting solution 0.9 ml. of 30 wt. percent aqueous sodium bisulfite was added. After stirring for 5 minutes, the solution had a pH of 3.2 and a hexavalent chromium concentration of less than 0.05 ppm. To this solution was added 0.1 ml. of 50 wt. percent aqueous sodium hydroxide with stirring for 15 minutes. (resulting solution pH=8.8) and then 1 ml. of hydrolyzed polyacrylamide flocculant was added. After settling the chromic hydroxide for 30 minutes and filtration, the solution had a trivalent chromium concentration of less than 0.066 ppm.

EXAMPLE 3

This is a control example. Into a 2-liter beaker was poured 1500 ml. of DI water, 0.215 grams of sodium dichromate dihydrate and 0.039 grams of disodium ethylenediaminetetraacetic acid dihydrate with stirring. The resulting solution had a hexavalent chromium concentration of 50 ppm and an ethylenediaminetetraacetate concentration of 20 ppm. After adding 0.08 ml. of 50 wt. percent sodium hydroxide and stirring for 30 minutes, a 500 ml. aliquot (pH=10.5) was removed and placed in another beaker. To the aliquot was added 0.05 ml. of concentrated sulfuric acid, and then the resulting solution was stirred for an additional 15 minutes (solution pH=2.9). To the solution was added 0.9 ml. of a 30 wt. percent aqueous sodium bisulfite solution. After stirring for 5 minutes, the solution had a pH of 3.3 and a hexavalent chromium concentration of less than 0.05 ppm. To this solution was added 0.07 ml. of 50 wt. percent sodium hydroxide with stirring for 15 minutes (resulting solution pH-8.8), and then 1 ml. of hydrolyzed polyacrylamide flocculant was added. After settling the chromic hydroxide for 50 minutes and filtration, the solution had a trivalent chromium concentration of 10.5 ppm.

EXAMPLES 4 TO 6

Following the procedure and using the ingredients set forth in Examples 1 to 3 above, the examples were repeated using ten-fold quantities of all ingredients (except the DI water which was used in identical amounts). The initial solution had a concentration of hexavalent chromium of 500 ppm and a concentration of ethylenediaminetetraacetate of 200 ppm. Example 4, which corresponded to Example 1 (ferric ion), provided a final solution having a trivalent chromium concentration of 0.26 ppm; Example 5 (corresponding to Example 2- aluminum ion) provided a trivalent chromium concentration of 0.64 ppm; and control Example 6 (corresponding to Example 3) had a final trivalent chromium concentration of 41 ppm.

EXAMPLES 7 TO 21

Typical waste water solutions were prepared that initially contained 157 ppm orthophosphate, 0.8 ppm of nitrite and 14 ppm of nonionic surfactants comprising a modified polyethoxylated straight chain alcohol and a polyethoxylated aliphatic base in addition to the initial concentrations of hexavalent chromium and ethylenediaminetetraacetate given below. The procedures of Examples 1, 2 and 3 were followed for the ferric ion, aluminum ion and control examples, respectively. The results are given in Table 1 below.

TABLE 1

| Example No. | Initial Concentration, ppm | | Cation Concentration (# of times the equivalents of EDTA) | | | | Final Conc.; ppm Trivalent Chromium |
|---|---|---|---|---|---|---|---|
| | EDTA | Hex Chromium | $Al^{+++}$ | $Fe^{+++}$ | $Mg^{++}$ | $Ca^{++}$ | |
| 7 | 20 | 50 | 25 | — | — | — | <0.08 |
| 8 | 20 | 50 | — | 25 | — | — | <0.08 |
| 9 (comparison) | 20 | 50 | — | — | 25 | — | 0.22 |

TABLE 1-continued

| Example No. | Initial Concentration, ppm EDTA | Initial Concentration, ppm Hex Chromium | Cation Concentration (# of times the equivalents of EDTA) Al$^{+++}$ | Fe$^{+++}$ | Mg$^{++}$ | Ca$^{++}$ | Final Conc.; ppm Trivalent Chromium |
|---|---|---|---|---|---|---|---|
| 10 (comparison) | 20 | 50 | — | — | — | 25 | 0.22 |
| 11 (control) | 20 | 50 | — | — | — | — | 0.22 |
| 12 | 20 | 50 | 1 | — | — | — | 0.27 |
| 13 | 20 | 50 | — | 1 | — | — | <0.06 |
| 14 | 20 | 50 | 3 | — | — | — | 0.09 |
| 15 | 20 | 50 | — | 3 | — | — | <0.06 |
| 16 | 20 | 500 | 3.5 | — | — | — | 0.92 |
| 17 | 20 | 500 | — | 1 | — | — | 0.07 |
| 18 (control) | 20 | 500 | — | — | — | — | 1.6 |
| 19 | 200 | 50 | 3.5 | — | — | — | 0.20 |
| 20 | 200 | 50 | — | 1 | — | — | 0.07 |
| 21 (control) | 200 | 50 | — | — | — | — | 14.4 |

It is to be noted that comparison Examples 9 and 10 (Mg$^{++}$ and Ca$^{++}$, respectively) provided poor results inasmuch as they gave no improvement relative to control Example 11.

In contrast, Al$^{+3}$ and Fe$^{+3}$ provided excellent final concentrations of trivalent chromium for both solutions initially containing 20:50 ppm EDTA:hex chromium and those containing 200:50 ppm EDTA:hex chromium relative to the controls despite the substantially altered ratios of EDTA to hexavalent chromium.

What is claimed is:

1. In a process for the removal of chrome from waste water which includes chromium in the hexavalent valence state, wherein the pH of said waste water is adjusted to below about 5, wherein a reducing agent is added to said waste water while its pH is below about 5 in an amount sufficient to convert all of the chromium present in the hexavalent valence state to the trivalent valence state, wherein the pH of the thus treated waste water is adjusted to about 7.5 to about 10.0 by adding thereto an inorganic base to permit formation of chromic hydroxide, wherein said chromic hydroxide is then removed from said waste water, and wherein said waste water contains at least one chelating agent which is capable of complexing trivalent chromium thereby making removal of the trivalent chromium from the waste water difficult, the improvement which comprises adding to the waste water while its pH is below about 5, either before or after said reducing agent is added to said waste water, one or more salts which are effective in promoting the precipitation of the chromic hydroxide notwithstanding the presence of said chelating agent for trivalent chromium, said salt being selected from the group consisting of the chloride and sulfate salts of ferric and aluminum in an amount sufficient to provide at least an amount in equivalents of the salt cation equal to 0.01 equivalents of trivalent chromium present after reduction, with the proviso that the amount in equivalents of the cation be equal to at least 0.8 times the equivalents of the chelating agent.

2. The process according to claim 1 in which the chrome is present initially in an amount of about 100 ppm or less and the chelating agent is present in an amount of about 50 ppm or less.

3. The process according to claim 1 in which the reducing agent is selected from the group consisting of sodium bisulfite and potassium bisulfite.

4. The process according to claim 1 in which the reducing agent is selected from the group consisting of sodium sulfite and potassium sulfite.

5. The process according to claim 1 in which the reducing agent is selected from the group consisting of sodium metabisulfite and potassium metabisulfite.

6. The process according to claim 1 in which the reducing agent is selected from the group consisting of ferrous sulfate and sulfur dioxide.

7. The process according to claim 1 in which the reducing agent is selected from the group consisting of zinc hydrosulfite, sodium hydrosulfite and potassium hydrosulfite.

8. The process according to claim 1 in which the salt of step (c) (ii) is selected from the group consisting of ferric chloride and aluminum chloride.

9. The process according to claim 1 in which the salt from step (c) (ii) is selected from the group consisting of ferric sulfate and aluminum sulfate.

10. The process according to claim 1 in which the inorganic base added in step (d) is sodium hydroxide.

11. The process according to claim 1 in which the inorganic base added in step (d) is potassium hydroxide.

12. The process according to claim 1 in which the inorganic base added in step (d) is calcium hydroxide.

13. The process according to claim 1 in which a flocculating agent is utilized to aid in the formation of chromic hydroxide in step (d).

14. The process according to claim 13 in which the flocculating agent is an anionic flocculating agent.

15. The process according to claim 14 in which the flocculating agent is a hydrolyzed polyacrylamide.

16. The process according to claim 1 in which step (e) is performed by sedimentation of the chromic hydroxide followed by separation of the chromic hydroxide from the aqueous medium.

17. A process according to claim 1 wherein said chelating agent is selected from the group consisting of: ethylenediaminetetraacetic acid or its sodium or potassium salts; N-2-naphthylacetamide; triethanolamine; N,N,N,N'-tetrakis(2-hydroxypropyl)ethylenediamine; gluconate; citrate; malonate; oxalate; salicylate; oxalic acid, malonic acid; and 1-anthroic acid.

18. A process for the removal of chrome from waste water containing chrome and ethylenediaminetetraacetic acid comprising in sequential order:

(a) providing an aqueous medium containing chrome and ethylenediaminetetraacetic acid;

(b) adjusting the pH of said aqueous medium to below about 5;

(c) adding to said aqueous medium, while maintaining said pH below about 5, and without regard to order of addition;
  i. sodium bisulfite in an amount sufficient to convert all of the chrome present in a hexavalent valence state to trivalent valence state and,
  ii. at least one salt selected from the group consisting of ferric chloride and ferric sulfate, in an amount sufficient to provide at least an amount in equivalents of ferric ion in said salt equal to 0.01 equivalents of trivalent chromium present after reduction, with the proviso that the amount in equivalents of the ferric ion be at least equal to 0.8 times the equivalents of the ethylenediaminetetraacetic acid,
(d) adjusting the pH of said aqueous medium to from about 7.5 to about 10.0 by the addition of an inorganic base to permit the formation of chromic hydroxide;
(e) adding hydrolyzed polyacrylamide to the aqueous medium in an amount sufficient to cause flocculation of the chromic hydroxide;
(f) removing said solid and flocculated chromic hydroxide from said solution.

* * * * *